United States Patent [19]

Miura et al.

[11] Patent Number: 6,033,189
[45] Date of Patent: Mar. 7, 2000

[54] CONTROL VALVE

[75] Inventors: Shintaro Miura; Ken Suitou; Masahiro Kawaguchi; Tetsuhiko Fukanuma; Hiroshi Kubo; Ryo Matsubara; Masatoshi Hiramatsu, all of Kariya; Michiyasu Nosaka, Chiryu; Kazuhito Miyagawa, Kariya; Shinya Miura; Mutsumi Yoshino, both of Nagoya, all of Japan

[73] Assignees: Kabushikki Kaisha Toyoda Jidoshokki Seisakusho; Denso Corporation, both of Aichi-ken, Japan

[21] Appl. No.: 09/078,270

[22] Filed: May 13, 1998

[30] Foreign Application Priority Data

| May 14, 1997 | [JP] | Japan | ........................... | 9-124556 |
| May 14, 1997 | [JP] | Japan | ........................... | 9-124557 |
| May 14, 1997 | [JP] | Japan | ........................... | 9-124558 |
| May 14, 1997 | [JP] | Japan | ........................... | 9-124559 |

[51] Int. Cl.[7] ........................................... F09B 1/26
[52] U.S. Cl. ....................... 417/222.2; 251/129.02; 251/129.15; 335/255; 439/607
[58] Field of Search ................... 417/222.2; 251/129.02, 251/129.15, 61.5; 335/255; 439/607, 608, 609, 610

[56] References Cited

U.S. PATENT DOCUMENTS

| 4,867,648 | 9/1989 | Murayama | ........................... 417/222.2 |
| 5,584,670 | 12/1996 | Kawaguchi et al. | ................. 417/222.2 |
| 5,645,435 | 7/1997 | Cimino et al. | ............................. 439/39 |

*Primary Examiner*—Charles G. Freay
*Attorney, Agent, or Firm*—Morgan & Finnegan, L.L.P.

[57] ABSTRACT

An improved displacement control valve incorporated in a variable displacement compressor. The control valve includes a valve body and a solenoid for actuating the valve body. The coil of the solenoid is wound about a bobbin made of insulating synthetic resin. A base plate integrally protrudes from the bobbin. A pair of conducting plates are secured to the base plate. Each plate has a clamping block. The coil has a pair of terminal wires. Each terminal wire is secured to and electrically corrected to one of the clamping blocks. Each terminal wire is wound about a holder formed in each plate between the bobbin and the corresponding clamping block. A diode is secured to the holders and is connected in parallel with the coil. A pair of terminals of the diode are secured to the corresponding holders by soldering and crimping. The holders prevent tension in the terminal wires from being applied to electrical joints formed between the wires and the clamping blocks, which makes the valve more reliable.

20 Claims, 12 Drawing Sheets

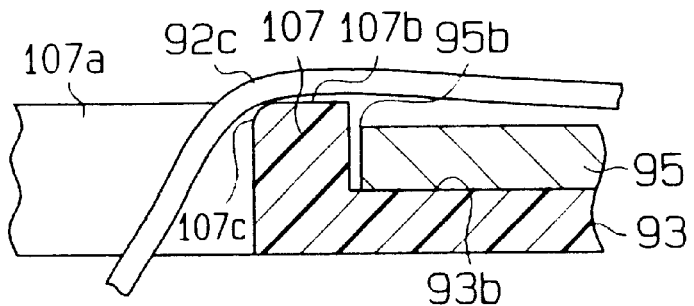
Fig.9A
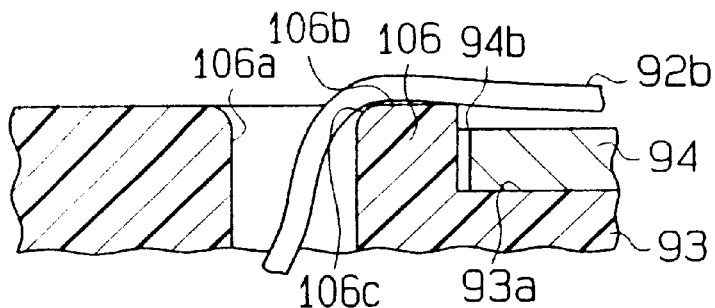
Fig.9B
Fig.10
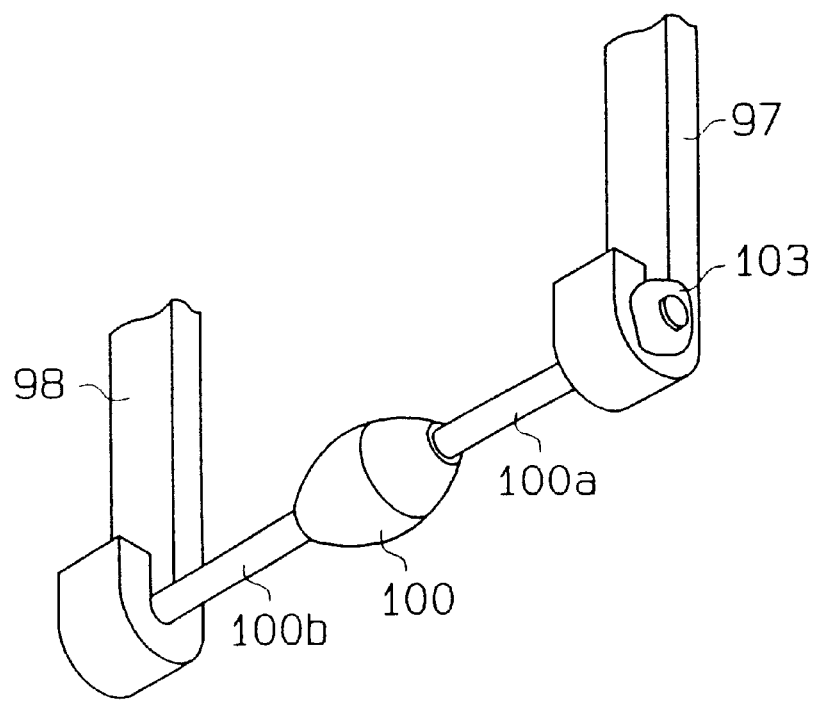

CONTROL VALVE

BACKGROUND OF THE INVENTION

The present invention relates to control valves that are used to control displacement in, for example, variable displacement compressors. More particularly, the present invention relates to a control valve that has a valve body and a solenoid for moving the valve body and is capable of maintaining satisfactory conductivity of the solenoid.

A variable displacement compressor typically has a displacement control valve that is arranged in a supply passage that connects a discharge chamber and a crank chamber. The control valve alters the opening amount of the supply passage to control the amount of refrigerant gas sent from the discharge chamber to the crank chamber thereby adjusting the pressure in the crank chamber. This alters the difference between oppositely directed pressures acting on a set of pistons, that is, the difference between the crank chamber pressure and the pressure in the cylinder bores. The pressure difference changes the inclination of a swash plate and thus varies the compressor displacement.

The control valve has a valve body for adjusting the opening amount of the supply passage and a solenoid for moving the valve body. A controller excites and de-excites the solenoid by means of a drive circuit based on various operating conditions such as the cooling load applied to the compressor. The valve body is moved to alter the opening amount of the supply passage based on the excitation and de-excitation of the solenoid. This adjusts the amount of refrigerant gas sent from the discharge chamber to the crank chamber.

As shown in FIGS. 15 and 16, the solenoid of a control valve has a coil unit 112. The coil unit 112 includes a cylindrical bobbin 113 made of an insulating synthetic resin and a coil 114 wound about the bobbin 113. A base plate 115 extends laterally from the lower portion of the bobbin 113. A power supply plate 116 and a ground plate 117 are fixed to the lower surface of the base plate 115. The coil 114 has an end that defines a terminal wire 114a leading to the power supply plate 116 and another end that defines a terminal wire 114b leading to the ground plate 117. The power supply plate 116 includes a clamping block 116a to clamp the terminal wire 114a. The ground plate 117 includes a clamping block 117a to clamp the terminal wire 114b. The ground plate 117 is connected to a grounded member.

The clamping blocks 116a, 117a are located at the distal end of the base plate 115. This facilitates the attachment of the terminal wires 114a, 114b to the associated clamping blocks 116a, 117a. The terminal wires 114a, 114b extend from the bobbin 113 toward the underside of the base plate 115 and past the plates 116, 117 to be connected to the associated clamping blocks 116a, 117a.

The power supply plate 116 includes a cathode holder 116b and a pin holder 116c. The ground plate 117b includes an anode holder 117b. A connector pin 118 is fixed to the pin holder 116c by a solder 121. A power supply wire (not shown) provided with a connector at its distal end extends from a drive circuit for driving the solenoid. The connector is engaged with the connector pin 118 such that the connector pin 118 is detachably connected to the drive circuit by means of the power supply wire.

A diode 119 is fixed to the cathode holder 116b and the anode holder 117b. The diode 119 has a cathode terminal 119a fixed to the cathode holder 116b by solder 122 and an anode terminal 119b fixed to the anode holder 117b by solder 122. The diode 119 functions to protect the drive circuit.

When electric current from the drive circuit stops, self-inductance produces counterelectromotive force in the coil 114. The current resulting from the counterelectromotive force is consumed by a closed circuit formed between the coil 114 and the diode 119 and does not enter the drive circuit. This prevents excessive electric load produced by counterelectromotive force from being applied to the drive circuit.

As shown in FIG. 15, the coil unit 112 is surrounded by insulating coating 120 made of synthetic resin. The coil 114, the base plate 115, the plates 116, 117, the diode 119 are immersed in the coating 120. This improves the insulation characteristics and weather resistance of the coil unit 112.

The base plate 115 is integrally formed with the bobbin 113. The bobbin 113, the base plate 115 and the coating 120 are made of synthetic resins, which have a greater coefficient of thermal expansion than that of metal. Heat generated by excitation of the solenoid causes the resin members to expand. The thermal expansion enlarges the space between the clamping blocks 116a, 117a of the plates 116, 117 and the coil 114 wound about the bobbin 113. The coil 114 is made of conductive metal and is not expanded by heat as much as the resin members. The thermal expansion of the resin members therefore results in tension acting on the coil's terminal wires 114a, 114b held by the clamping blocks 116a, 17a. This may bread the terminal wires 114a, 114b, which have relatively weaker tensile strength.

As shown in FIGS. 17A and 17B, the terminal wire 114b directly contacts an edge 117c of the ground plate 117, and the terminal wire 114a directly contacts an edge 116d of the power supply plate 117. Thus, when receiving tension, or when stretched, the terminal wires 114a, 114b are pressed against the edges 116d, 117c. Also, assembly of the coil unit 112 may cause he terminal wires 114a, 114b to be pressed against the edges 116d, 117c. As a result, the terminal wires 114a, 114b may be damaged or broken.

Temperature changes expand or contract the base plate and the coating 120. Expansion and contraction of the plate 115 and the coating 120 change the distance between the cathode holder 116b of the power supply plate 116 and the anode holder 117b of the ground plate 117. However, like the coil 114, the terminals 119a, 119b of the diode 119 are made of conductive metal. Therefore, the length of the diode 119 is changed little by temperature changes. Changes of the distance between the cathode holder 116b and the anode holder 117b apply a reactive force to the solder 122, which fixes the terminals 119a, 119b to the holders 116b, 117b. The reactive force wears the solder 122 and degrades the bonding strength between the terminals 119a, 119b and the holders 116b, 117b. This mad result in unsatisfactory electrical conductivity between the terminals 119a, 119b and the holders 116b, 117b.

During installation of the compressor in a vehicle or during a maintenance of the compressor, the connector, which is attached to the distal end of the power supply wire extending from the drive circuit, is connected to and is disconnected from the connector pin 118 of the solenoid. Such connection and disconnection applies reactive force to the solder 121, which fixes the connector pin 118 to the pin holder 116c. The reactive force wears the solder 121 and degrades the bonding strength between the connector pin 118 and the pin holder 116c. This may result in unsatisfactory electrical conductivity between the connector pin 118 and the holder 116c.

SUMMARY OF THE INVENTION

Accordingly, it is an objective of the present invention to provide a valve that maintains satisfactory conductivity of the solenoid.

To achieve the foregoing and other objectives and in accordance with the purpose of the present invention, a valve that prevents electrical joints in a solenoid, more particularly terminal wires of a coil, from being damaged is provided. The valve includes a solenoid and a valve body actuated by the solenoid. The solenoid includes a coil and generates electromagnetic force to actuate the valve body based on electric current supplied to the coil. The valve further includes a support made of insulating synthetic resin, a conductive mounting member and a holding member. The support supports the coil. The coil includes a terminal wire extending from the support. The mounting member is secured to the support. The mounting member includes a connecting member to which the terminal wire is electrically fixed. The holding member is formed on the mounting member for holding part of the terminal wire between the support and the connecting member.

The support may include a bobbin to wind the coil and a base plate extending from the bobbin, and the mounting member may be secured to the base plate. The base plate includes a guide member to prevent the terminal wire between the bobbin and the connecting member of the mounting member from contacting an edge of the mounting member.

The valve may include an electrical component that is electrically connected to the coil through the mounting member to supply electricity to the solenoid or to improve operation of the solenoid. The mounting member includes a holder. The electrical component is brazed to and mechanically secured to the holder. This prevents electrical joints in the solenoid, more particularly, parts to which a diode and a connector pin are secured, from being damaged.

The attachment of electrical element such as a diode may be modified as follows. The mounting member includes a pair of mounting plates, each having a holder. The holders are spaced apart by a predetermined distance. Each terminal of the electrical element is secured to one of the holders. At least one of the terminals is bent to allow the effective length of the electrical element between the holders to be changed. This structure also prevents the parts to which electrical elements such as a diode are fixed from being damaged.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 9A is a partial cross-sectional view taken along line 9A—9A of FIG. 7;

FIG. 9B is a cross-sectional view taken along line 9B—9B of FIG. 7;

FIG. 10 is an enlarged perspective view illustrating a mounting structure of a diode to holders according to a second embodiment of the present invention;

DETAILED DESCRIPTION OF THE PREFERRED EMBODIMENTS

Figure 1:
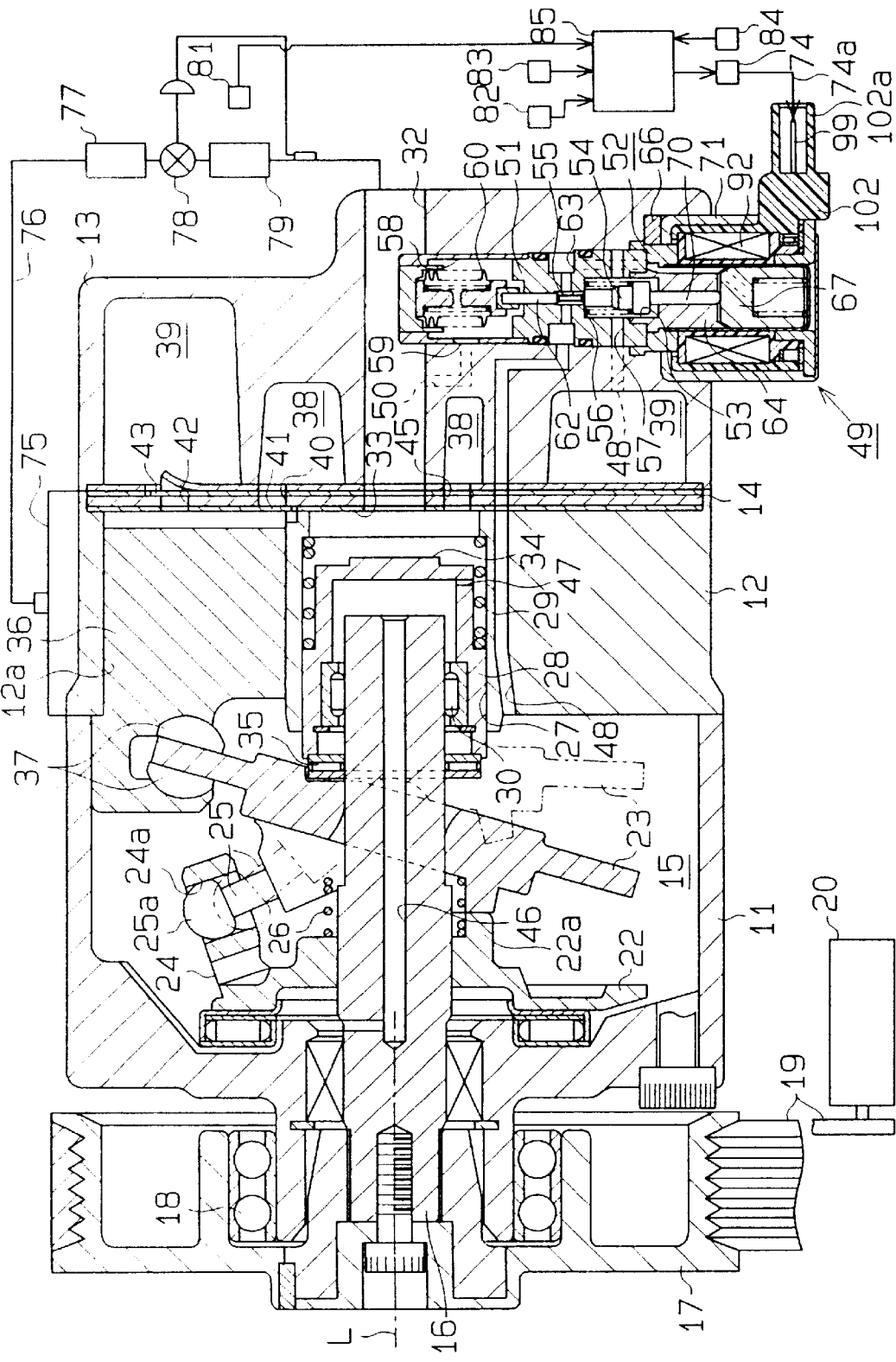
FIG. 1 is a cross-sectional view illustrating a variable displacement compressor according to a first embodiment of the present invention, in which the inclination of the swash plate is maximum.

A variable displacement compressor according to a first embodiment of the present invention will now be described with reference to FIGS. 1 to 9. As shown in FIG. 1, a front housing 11 is secured to the front end face of a cylinder block 12. A rear housing 13 is secured to the rear end face of the cylinder block 12, and a valve plate 14 is located between the rear housing 13 and the rear end face. A crank chamber 15 is defined by the inner walls of the front housing 11 and the front end face of the cylinder block 12.

A drive shaft 16 is rotatably supported in the front housing 11 and the cylinder block 12 and extends through the crank chamber 15. The front housing 12 has a cylindrical wall extending forward. The front end of the drive shaft 16 is surrounded by the cylindrical wall and is secured to a pulley 17. The pulley 17 is rotatably supported by the cylindrical wall with an angular bearing 18. The pulley 17 is directly coupled to an external drive source (a vehicle engine 20 in this embodiment) by a belt 19. The compressor of this embodiment is referred to as a clutchless type variable displacement compressor since it is not clutched on and off.

A drive plate, or swash plate 23, is supported by the drive shaft 16 in the crank chamber 15 to slide along and to tilt with respect to the axis L of the shaft 16. A pair of guiding pins 25 are fixed to the swash plate 23. Each guiding pin 25 has a guide ball 25a at its distal end. A rotor 22 is fixed to the drive shaft 16 in the crank chamber 15 to integrally rotate with the drive shaft 16. The rotor 22 has a support arm 24 protruding toward the swash plate 23. A pair of guide holes 24a are formed in the support arm 24. Each guide pin 25 is slidably fitted into the corresponding guide hole 24a. The cooperation of the arm 24 and the guide pins 25 permits the swash plate 23 to rotate together with the drive shaft 16. The cooperation also guides the tilting of the swash plate 23 and the sliding of the swash plate 23 along the axis L of the drive shaft 16. As the swash plate 23 slides rearward toward the cylinder block 12, the inclination of the swash plate 23 decreases.

A coil spring 26 is located between the rotor 22 and the swash plate 23. The spring 26 urges the swash plate 23 rearward, or in a direction decreasing the inclination of the swash plate 23. The rotor 22 is provided with a projection 22a on its rear end face. Abutment of the swash plate 23 against the projection 22a limits the maximum inclination of the swash plate 23.

Figure 2:
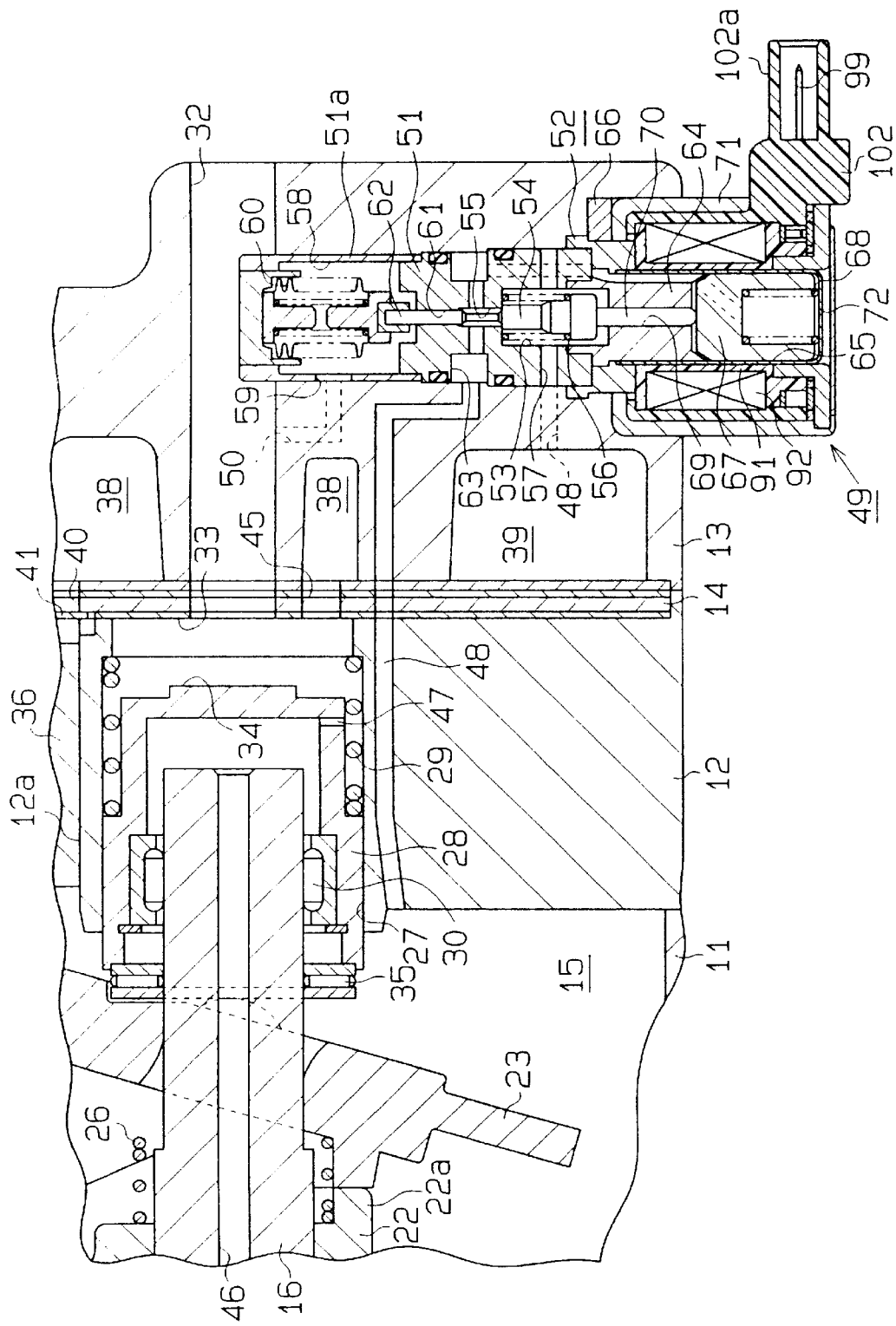
FIG. 2 is an enlarged partial cross-sectional view illustrating the compressor of FIG. 1.
Figure 3:
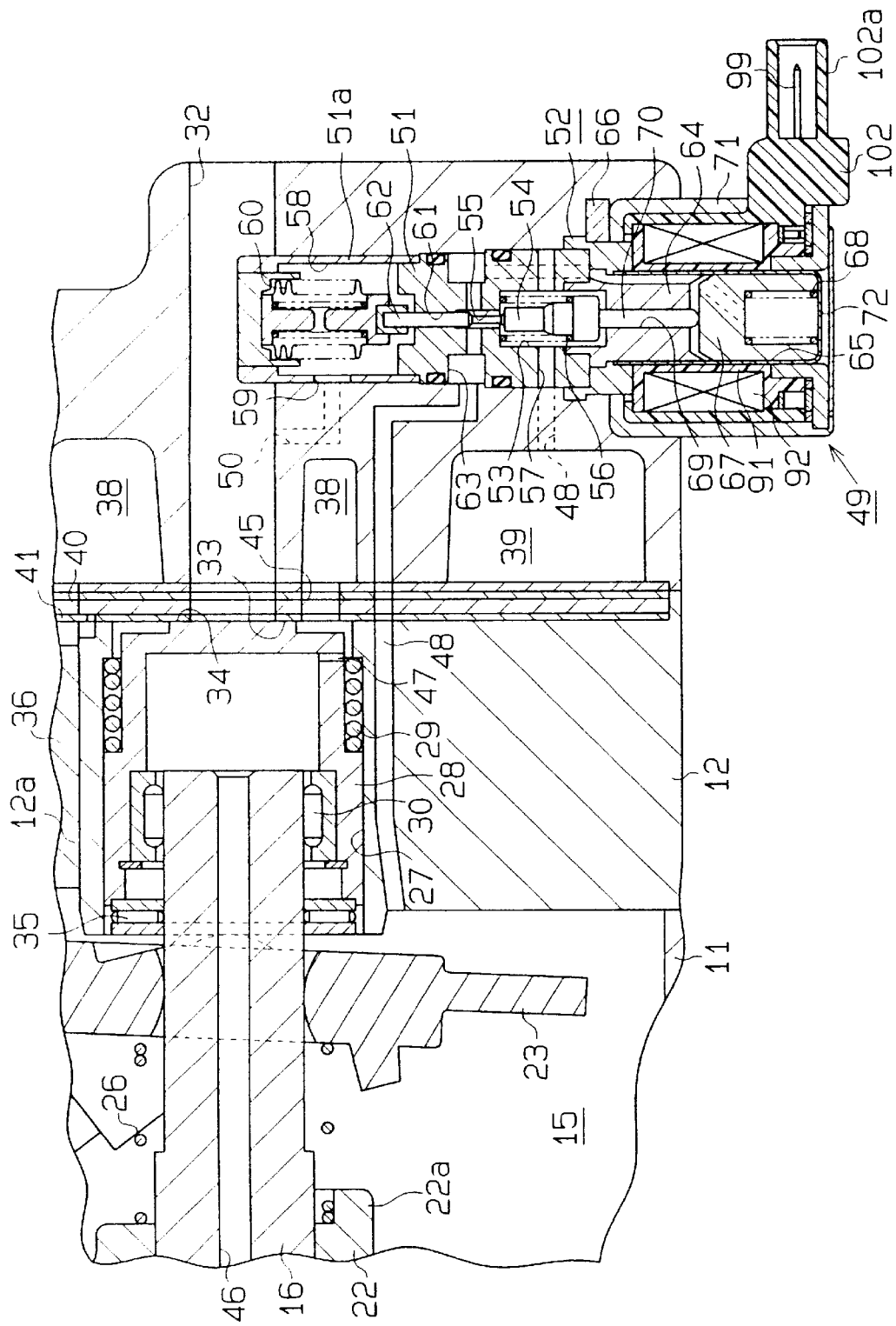
FIG. 3 is an enlarged partial cross-sectional view illustrating the compressor of FIG. 1 when the inclination of the swash plate is minimum.

As shown in FIGS. 1 to 3, the cylinder block 12 has a shutter chamber 27 at its center portion. The shutter chamber 27 extends along the axis L of the drive shaft 16. A cup-shaped shutter 28 is accommodated in the shutter chamber 27. The shutter 28 slides along the axis L of the drive shaft 16. A coil spring 29 is located between a step formed in the circumference of the shutter 28 and a step formed in the shutter chamber 27. The coil spring 29 urges the shutter 28 toward the swash plate 23.

The rear end of the drive shaft 16 is inserted in the shutter 28. A radial bearing 30 is fixed to the inner wall of the shutter 28. The radial bearing 30 slides with the shutter 28 relative to the drive shaft 16. The rear end of the drive shaft 16 is supported by the inner wall of the shutter chamber 27 with the radial bearing 30 and the shutter 28 in between.

A suction passage 32 is defined at the center portion of the rear housing 13 and the valve plate 14. The passage 32 extends along the axis L of the drive shaft 16 and communicates with the shutter chamber 27. A positioning surface 33 is formed on the valve plate 14 about the inner opening of the suction passage 32. The rear end of the shutter 28 functions as a shutting surface 34, which abuts against the positioning surface 33. Abutment of the shutting surface 34 against the positioning surface 33 prevents the shutter 28 from further moving rearward away from the rotor 22. The abutment also disconnects the suction passage 32 from the shutter chamber 27.

A thrust bearing 35 is supported on the drive shaft 16 and is located between the swash plate 23 and the shutter 28. The thrust bearing 35 slides along the axis L of the drive shaft 16. The force of the coil spring 29 constantly retains the thrust bearing 35 between the swash plate 23 and the shutter 28.

The swash plate 23 moves rearward as its inclination decreases. As it moves rearward, the swash plate 23 pushes the shutter 28 rearward with the thrust bearing 35. Accordingly, the shutter 3 moves toward the positioning surface 33 against the force of the coil spring 29. As shown in FIG. 3, when the shutting surface 34 of the shutter 28 abuts against the positioning surface 33, the swash plate 23 reaches the minimum inclination. In this state, the shutter 23 is located at the closed position for disconnecting the shutter chamber 27 from the suction passage 32. The minimum inclination of the swash plate 23 is slightly more than zero degrees. Zero degrees refers to the angle of the swash plate with respect to a plane perpendicular to the axis L of the rotary shaft 16.

As shown in FIG. 1, cylinder bores 12a extend through the cylinder block 12. The cylinder bores 12a extend parallel to the axis L of the drive shaft 16 and are angularly spaced apart at equal intervals about the axis L. A single-headed piston 36 is accommodated in each cylinder bore 12a. Each piston 36 is operably coupled to the swash plate 23 by a pair of shoes 37. The swash plate 23 is rotated by the rotary shaft 16 through the rotor 22. Rotation of the swash plate 23 is transmitted to each piston 36 through the shoes 37 and is converted to linear reciprocation of each piston 36 in the associated cylinder bore 12a.

An annular suction chamber 38 is defined in the center portion of the rear housing 13 about the suction passage 32. An annular discharge chamber 39 is defined about the suction chamber 37 in the rear housing 13. Suction ports 40 and discharge ports 42 are formed in toe valve plate 14. Each suction port 40 and each discharge port 42 correspond to one of the cylinder bores 12a. Suction valve flaps 41 are formed on the valve plate 14. Each suction valve flap 41 corresponds to one of the suction ports 40. Discharge valve flaps 43 are formed on the valve plate 14. Each discharge valve flap 43 corresponds to one of the discharge ports 42.

As each piston 36 moves from the top dead center to the bottom dead center in the associated cylinder bore 12a, refrigerant gas in the suction chamber 38 is drawn into each cylinder bore 12a through the associated suction port 40 while causing the associated suction valve flap 41 to flex to an open position. As each piston 36 moves from the bottom dead center to the top dead center in the associated cylinder bore 12a, refrigerant gas is compressed in the cylinder bore 12a and is discharged to the discharge chamber 39 through the associated discharge port 42 while causing the associated discharge valve flap 43 to flex to an open position.

As shown in FIGS. 1–3, the suction chamber 38 is connected with the shutter chamber 27 by a communication hole 45. When contacting the positioning surface 33, the shutting surface 34 disconnects the hole 45 from the suction passage 32. The drive shaft 16 has an axial passage 46. The axial passage 46 connects the crank chamber 15 with the interior of the shutter 28. A pressure release hole 47 is formed in the shutter wall near the rear end of the shutter 28 for connecting the interior of the shutter 28 with the shutter chamber 27. The axial passage 46, the release hole 47 and the hole 45 constitute a bleeding passage for bleeding refrigerant gas in the crank chamber 15 to the suction passage 38.

A supply passage 48 is defined in the rear housing 13, the valve plate 14 and the cylinder block 12 for connecting the discharge chamber 39 with the crank chamber 15. A displacement control valve 49 is accommodated in the rear housing 13 to regulate the supply passage 48. A pressure introduction passage 50 is defined in the rear housing 13 for connecting the control valve 49 with the suction passage 32.

As shown in FIGS. 2 and 3, the control valve 49 includes a housing 51 and the solenoid 52, which are secured to each other. A valve chamber 53 is defined between the housing 51 and the solenoid 52. The valve chamber 53 is connected to the discharge chamber 39 by a first port 57 and the upstream portion of the supply passage 48. The valve chamber 53 accommodates a valve body 54. The housing 51 also has a valve hole 55 extending axially. The lower opening of the valve hole 55 communicates with the valve chamber 53 and faces the valve body 54. An opening spring 56 extends between the valve body 54 and a wall of the valve chamber 53. The spring 56 urges the valve body 54 in a direction opening the valve hole 55.

A cap 51a is secured to the upper end of the housing 51. The cap 51a and the housing 51 define a pressure sensing chamber 58. The sensing chamber 58 accommodates a bellows 60 and is connected to the suction passage 32 by a second port 59 and the pressure introduction passage 50. A first guide hole 61 is defined in the housing 51 between the sensing chamber 58 and the valve hole 55. A pressure sensing rod 62 extends through and slides with respect to the first guide hole 61. The rod 62 couples the bellows 60 with the valve body 54. The rod 62 has a small diameter portion, which extends through valve hole 55. A clearance between the small diameter portion and the valve hole 55 permits the flow of refrigerant gas.

A third port 63 is formed in the housing 51 between the valve chamber 53 and the sensing chamber 58. The third port 63 extends transversely to an intersects the valve hole 55. The valve hole 55 is connected with the crank chamber 15 by the third port 63 and the downstream portion of the supply passage 48.

The solenoid 52 includes a cylindrical cuter casing 71 and a plunger cup 72. A fixed iron core 64 is fitted to the upper opening of the plunger cup 72. The fixed core 64 and the cup 72 define a plunger chamber 65. A cup-shaped plunger 67 is reciprocally accommodated in the plunger chamber 65. A follower spring 68 extends between the plunger 67 and the bottom of the cup 72. The force of the follower spring 68 is smaller than the force of the opening spring 56.

The fixed core 64 has a second guide hose 69 extending between the plunger chamber 65 and the valve chamber 53. A solenoid rod 70 is formed integrally with the valve body 54 and projects downward from the bottom of the valve body 54. The rod 70 extends through and slides with respect to the second guide hole 69. The springs 56 and 68 cause the lower end of the rod 70 to constantly contact the plunger 67. In other words, the valve body 54 moves integrally with the plunger 67 with the rod 70 in between.

Figure 4:
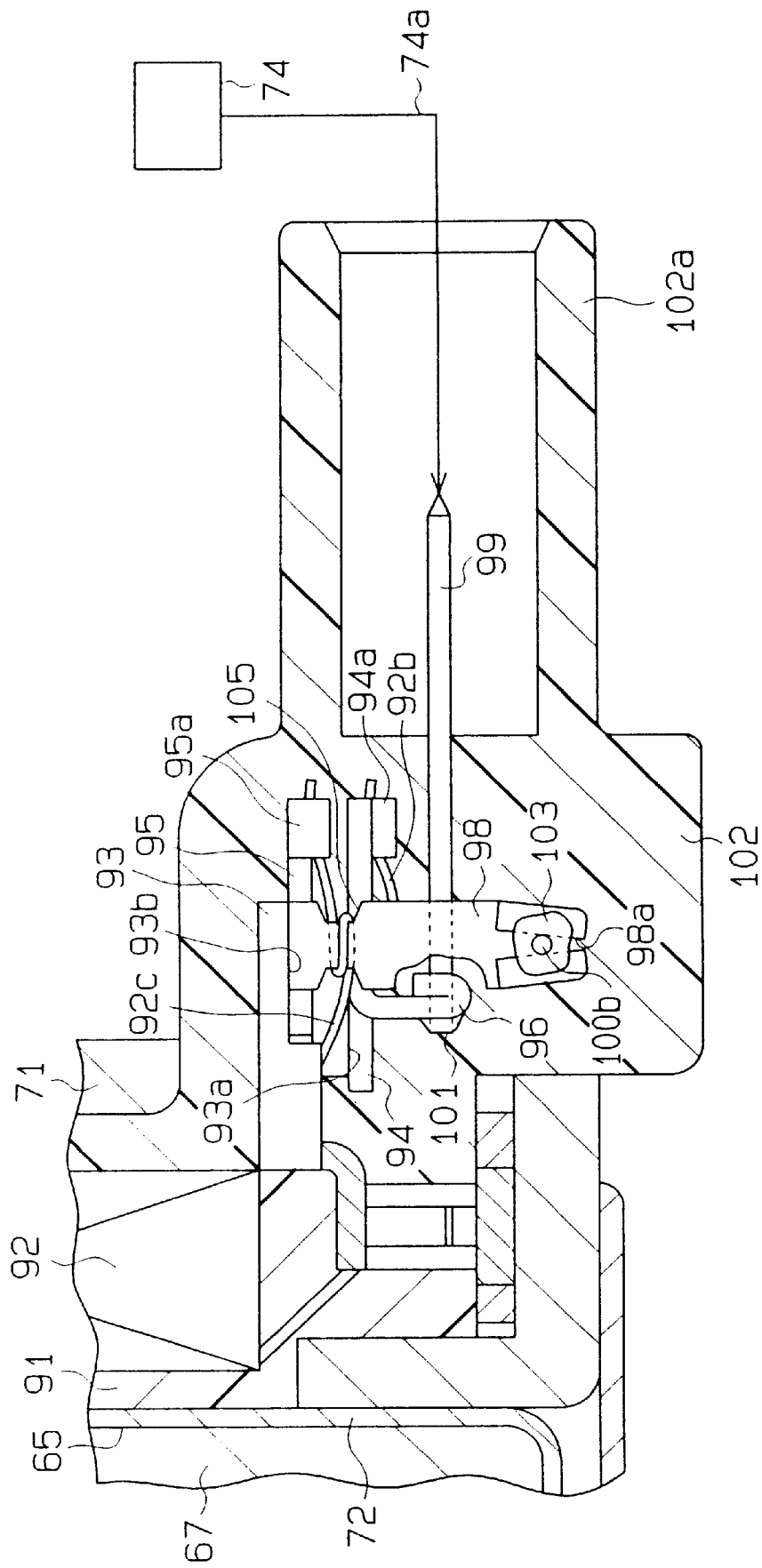
FIG. 4 is an enlarged partial cross-sectional view illustrating a control valve incorporated in the compressor of FIG. 1.
Figure 5:
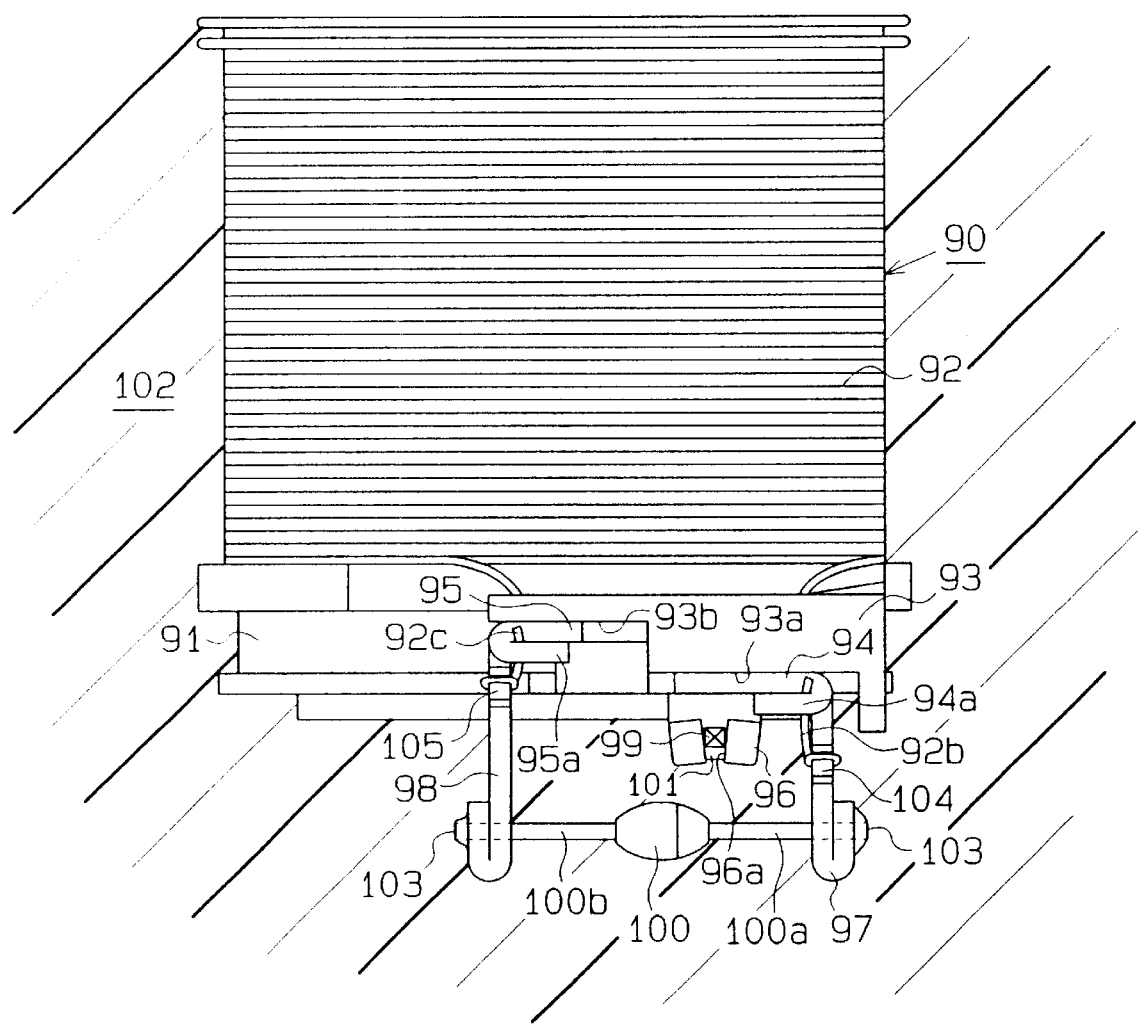
FIG. 5 is an enlarged view illustrating the coil unit in the control valve FIG. 4.
Figure 6:
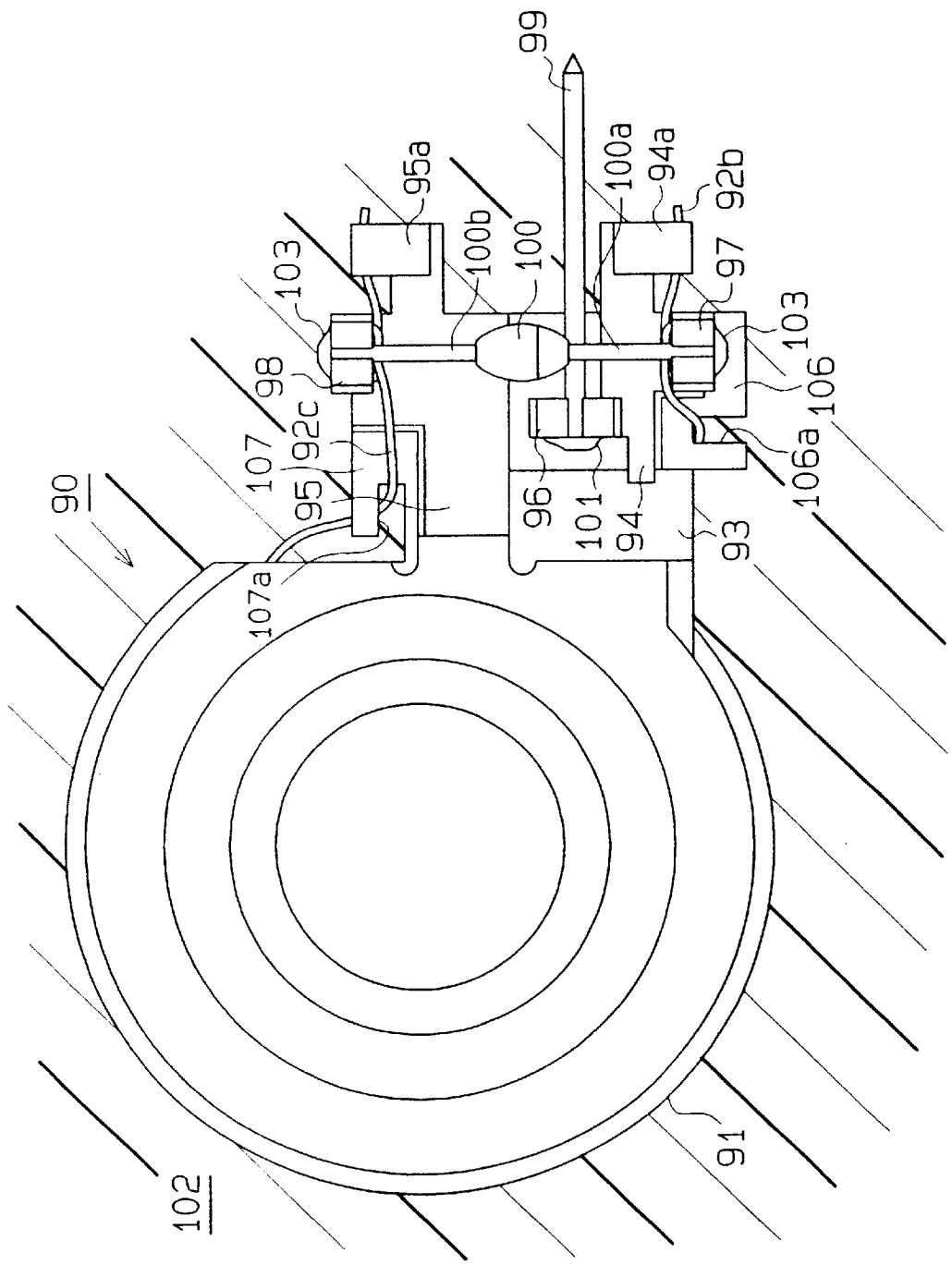
FIG. 6 is a bottom view illustrating the coil unit of FIG. 5.

FIG. 4 is an enlarged partial cross-sectional view of the control valve 49. FIGS. 5 and 6 illustrate a coil unit 90 accommodated in the solenoid 52. The coil unit 90 includes a cylindrical bobbin 91 made of insulating synthetic resin. The bobbin 91 is fitted about the plunger cup 72 and is located radially outward of both the fixed core 64 and the plunger 67. A coil 92 wound about the bobbin 91. The coil 92 has an end that defines a supply terminal wire 92b and another end that defines a ground terminal wire 92c. A base plate 93 is integrally formed with the bobbin 91 and extends laterally from the lower portion of the bobbin 91. The base plate 93 includes a first base surface 93a and a second base surface 93b. The base surfaces 93a and 93b are vertically displaced from each other as viewed in FIG. 5.

A power supply plate 94 made of conductive metal is fixed to the first base surface 93a of the base plate 93. Likewise, a ground plate 95 made of conductive metal is fixed to the second base surface 93b. The power supply plate 94 includes a clamping block 94a to clamp the supply terminal wire 92b of the coil 92. The clamping block 94a is fixed to the plate 94 by, for example, resistance welding. The ground plate 95 includes a clamping block 95a to clamp the ground terminal wire 92c of the coil 92. The clamping block 95 is fixed to the plate 95 by, for example, resistance welding. A bracket 66 is attached to the upper portion of the solenoid 52 (see FIGS. 1–3). The ground plate 95 is electrically connected with the rear housing 13 of the compressor by the bracket 66. Therefore, the ground terminal wire 92c of the coil 92 is grounded by way of the rear housing 13.

The power supply plate 94 has a pin holder 96 and a cathode holder 93. The holders 96, 97 are formed by bending part of the plate 94 downward. Likewise, an anode holder 98 is formed by bending part of the ground plate 95 downward. The cathode holder 97 and the anode holder 98 are located in parallel planes, respectively, and spaced apart by a predetermined distance.

A connector pin 99 is fixed to the pin holder 96. The pin 99 is electrically connected with the supply terminal wire 92b of the coil 92 by the power supply plate 94. A diode 100 is fixed to the cathode holder 97 and the anode holder 98. The diode 100 has a cathode terminal 100a fixed to the cathode holder 97 and an anode terminal 100b fixed to the anode holder 98. In other words, the diode 100 is connected in parallel with the coil 92 by the plates 94, 95.

The coil unit 99 is surrounded by insulating coating 102 made of synthetic resin. The coil 92, the plates 94, 95 formed on the base plate 93 and the diode 100 are immersed in the coating 102. The coating 102 improves the insulation characteristics and weather resistance of the parts in the coil unit 90.

A cylindrical socket 102a is integrally formed with the coating 102 and protrudes laterally from the coating 102 as shown in FIG. 4. The distal end of the connector pin 99 projects into the inner space of the socket 102. The connector pin 99 is connected to a drive circuit 74 by a supply line 74a. The drive circuit 74 is connected, for example, to a vehicle battery (not shown). The supply line 74a extends from the drive circuit 74 and has a connector (not shown) at its distal end. The connector is fitted in the socket 102a for detachably connecting the connector pin 99 with the drive circuit 74.

The clamping blocks 94a, 95a of the plates 94, 95 extend from the distal end of the base plate 93 for maximizing the distance from the bobbin 91. Such a construction facilitates fixing the terminal wires 92b, 92c to the clamping blocks 94a, 95a.

Figure 7:
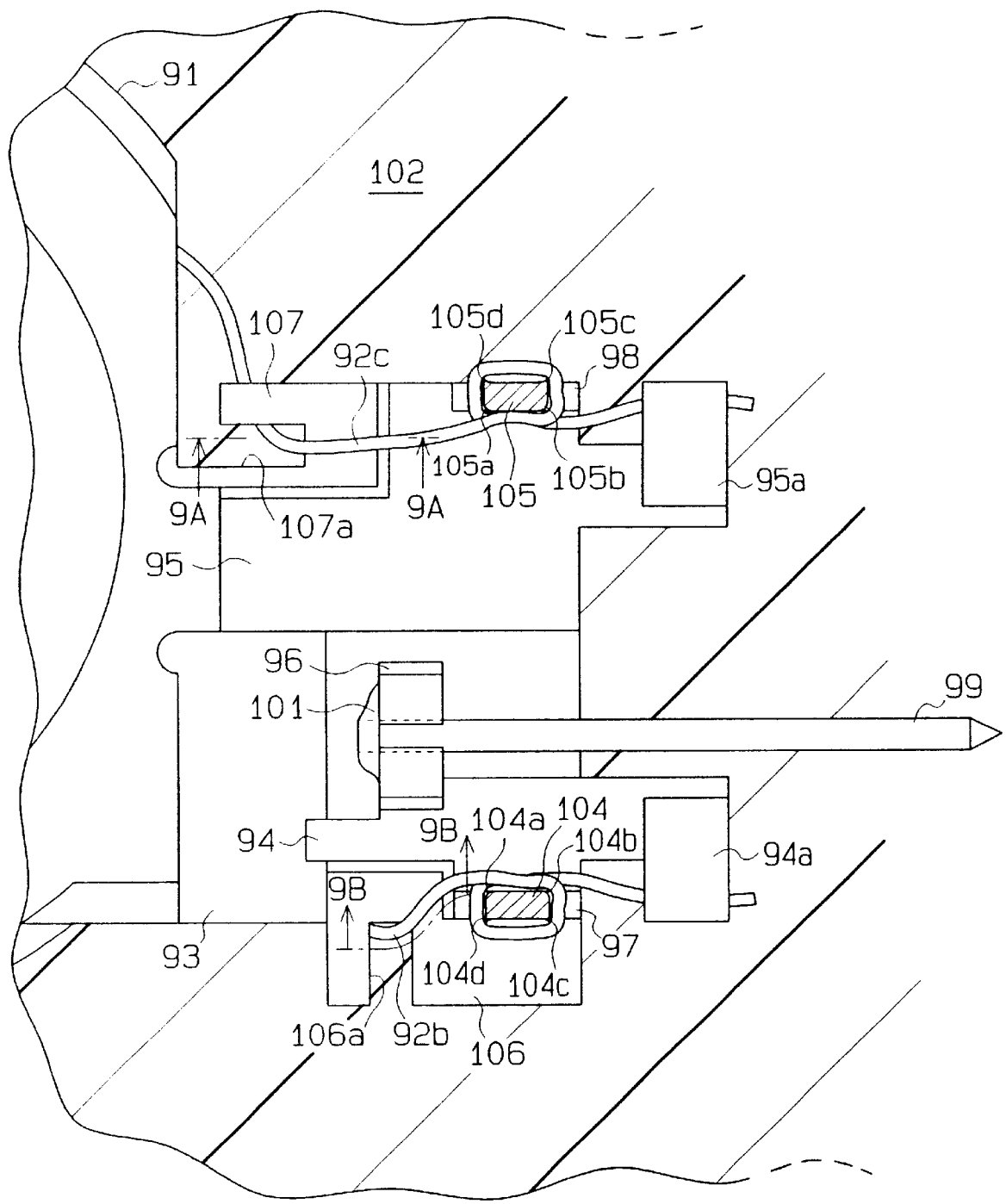
FIG. 7 is an enlarged partial bottom view, with a part cut away, illustrating a winding of coil terminal wires about holders in the coil unit of FIG. 5.

As shown in FIGS. 7 and 9B, the base plate 93 includes a first guide 106 protruding downward to the first base surface 93a. The first guide 106 is located adjacent to the power supply plate 94. The height of the first guide 106 from the first base surface 93a is greater than the thickness of the power supply plate 94.

As shown in FIGS. 7 and 9A, the base plate 93 includes a second guide 107 protruding downward from the second base surface 93b. The second guide 107 is located adjacent to the ground plate 95. The height of the second guide 107 to the second base surface 93b is greater than the thickness of the ground plate 95. The guides 106, 107 are integrally formed with the base plate 93. In FIGS. 9A and 9B, the upper side of the drawings represents the bottom side of the coil unit 90. Therefore, guide surfaces 106b, 107b, which are defined on the lower sides of the guides 106, 107, are located below the corresponding plates 94, 95.

The first guide 136 has a notch 106a and the second guide 107 has a notch 107a. A lip 106c about the notch 106a is rounded as shown in FIG. 9B. Likewise, a lip 107c about the notch 107a is rounded as shown in FIG. 9A.

The supply terminal wire 92b of the coil 92 extends from the bobbin 91 and passes through the notch 106a toward the bottom surface of the base plate 93. The terminal wire 92b is then bent along the lip 106c and passes by the guide surface 106b and the power supply plate 94 to reach the clamping block 94a. The ground terminal wire 92c of the coil 92 extends from the bobbin 91 and passes through the notch 107a toward the bottom surface of the base plate 93. The terminal wire 92c is then bent along the lip 107c and passes by the guide surface 107b and the ground plate 95 to reach the clamping block 95a.

As shown in FIGS. 4, 5 and 7, the cathode holder 97 has a narrowed portion 104 near its proximal end. Likewise, the anode holder 98 has a narrowed portion 105 near its proximal end. As shown in FIG. 7, the narrowed portions 104, 105 have rectangular cross sections. Thus, the narrowed portion 104 has four corners 104a–104d and the narrowed portion 105 has four corners 105a–105d.

On the way to the clamping block 94a, the supply terminal wire 92b is wound about the narrowed portion 104 of the cathode holder 97. Similarly, the ground terminal wire 92c is wound about the narrowed portion 105 of the anode holder 98 on the way to the clamping block 95a. In this manner, the terminal wires 92b, 92c of the coil 92 are held by holders, or the plates 94, 95 on the way to the clamping blocks 94a, 95a.

The plates 94, 95 are manufactured inexpensively by punching metal plates. As is usual with punched products, the edge of one side of the plates 94, 95 is sagged, or rounded, while the edge of the other side is sharply burred. Such sags and burrs are also formed on the narrowed portions 104, 105 of the holders 97, 98 when pressing the plates 34, 95. FIG. 7 illustrates sags and burrs formed on the narrowed portions 104, 105 in an exaggerating manner. The inner corners 104a, 104b, 105a, 105b of the narrowed portions 104, 105 are sagged, or rounded. The outer corners 104c, 104d, 105c, 105d are sharply burred.

When wound about the narrowed portions 104, 105, the terminal wires 92b, 92c are initially bent along the sagged corners 104b and 105b. The terminal wires 92b, 92c are then bent along the burred corners 104c, 104d, 105c, 105d and along the sagged corner 104a, 105a before reaching the clamping blocks 94a, 95a. In other words, the terminal wire 92b extending from the bobbin 91 toward the narrowed portion 104 and the terminal wire 92c extending from the bobbin 31 toward the narrowed portion 105 are first bent along the rounded corners 104b, 105b, respectively. Likewise, the portion of the terminal wire 92b extending between the clamping block 94a and the narrowed portion 104 and the portion of the terminal wire 92c extending between the clamping block 95a toward the narrowed portion 105 contact the rounded corners 104a, 105a, respectively.

Figure 8:
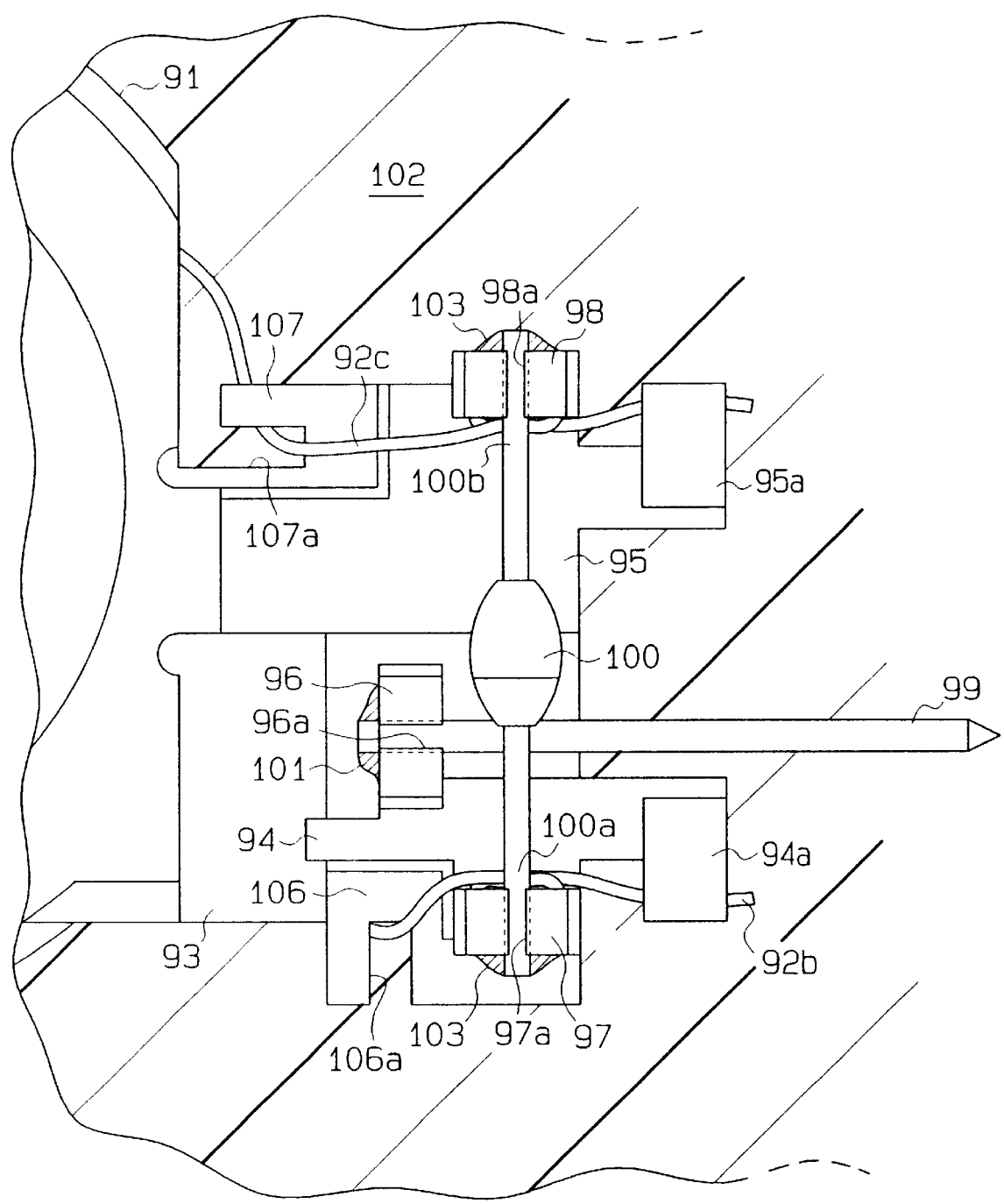
FIG. 8 is an enlarged partial bottom view illustrating the attachment of a diode and a connector pin to holders in the coil unit of FIG. 5.

Next, the attachment structure of the connector pin 99 to the holder 96, and the attachment structure of the diode 100 to the holders 97, 98 will be described. As shown in FIGS. 4, 5 and 8, the holder 96 has a notch 96a at its distal end for holding the connector pin 99. In other words, the distal end of the holder 96 is divided into two branches by the notch 96a. Each branch is bent by 180 degrees. This makes the branches approximately twice as thick as the rest or the holder 96. The distal end, or each branch, of the holder 96 is crimped from both sides with the distal end of the connector pin 99 inserted in the notch 96a. As a result, the connector pin 99 is firmly held in the notch 96a. The proximal end of the pin 99 is also brazed, or is soldered, to the holder 96. Solder 101 between the connector pin 99 and the pin holder 36 increases the contact area between the pin 99 and the holder 96 to improve conductivity.

The attachment of each end of the diode 100 to the holders 97, 98 is the same as that of the connector pin 99. That is, as shown in FIGS. 4, 5 and 8, the cathode holder 97 has a notch 97a at its distal end and the anode holder 98 has a notch 98a at its distal end. In other words, the distal ends of the holders 97, 98 are divided into two branches by the notches 97a, 98a. Each branch is bent by 180 degrees. This makes the branches approximately twice as thick as the rest of the holders 97, 98. The distal ends, or the branches, of the holders 97, 98 are crimped from both sides with the terminals 100a, 100b of the diode 100 inserted in the notch 97a, 98a. As a result, the terminals 100a, 100b are firmly held in the notches 97a, 98a. The terminals 100a, 100b are also brazed or, are soldered, to the holders 97, 98. Solder 103 between the terminals 100a, 100b and the holders 97, 98 increases the contact area between the terminals 100a, 100b and the holders 97, 98 to improve conductivity.

As described above, the pin 99 and the diode terminals 100a, 100b are soldered to the holders 96, 97, 98 and mechanically fixed to the holders 96, 97, 98 by crimping.

As shown FIG. 1, an outlet port 75 is formed in the cylinder block 12 and is communicated with the discharge chamber 39. The outlet port 75 is connected to the suction passage 32 by an external refrigerant circuit 76. The refrigerant circuit 76 includes a condenser 77, an expansion valve 78 and an evaporator 79. The compressor, the condenser 77, the expansion valve 78 and the evaporator 79 make up a vehicle air conditioner.

A controller 85 is connected to various devices including a temperature sensor 81, a compartment temperature sensor 82, an air conditioner starting switch 83 and a temperature adjuster 84. The temperature sensor 81 is located in the vicinity of the evaporator 79 for detecting the temperature of the evaporator 79. The compartment temperature sensor 82 detects the temperature in the vehicle passenger compartment. A passenger sets a desirable compartment temperature, or a target temperature, by the temperature adjuster 84. The controller 85 computes a duty ratio based on various data including a target temperature set by the temperature adjuster 84, the temperature detected by the temperature sensor 81, the compartment temperature detected by the temperature sensor 82, and the ON/OFF signal from the air conditioner starting switch 83. The controller 85 then transmits the computed duty ratio to the drive circuit 74. The drive circuit 74 feeds current, the fluctuations of which correspond to the inputted duty ratio, to the coil 92 of the control valve 49. The solenoid 52 of the valve 49 is repeatedly excited and de-excited in accordance with the duty ratio. The greater the duty ratio becomes, the greater the attractive force generated by the solenoid 52 between the fixed core 64 and the plunger 67.

The operation of the compressor having the valve 49 will now be described.

When the switch 83 is on, if the compartment temperature detected by the temperature sensor 82 is equal to or greater than a value set by the temperature adjuster 84, the controller 85 commands the drive circuit 74 to excite solenoid 52. Specifically, the controller 85 transmits a predetermined duty ratio, which is greater than 0%, to the drive circuit 74. The drive circuit 74 supplies a current, the fluctuations of which correspond to the inputted duty ratio, to the coil 92 of the solenoid 52.

Supplying the current to the coil 92 produces a magnetic attractive force in accordance with the duty ratio between the core 64 and the plunger 67. The attractive force is transmitted to the valve body 54 by the solenoid rod 70, and thus urges the valve body 54 against the force of the spring 56 in a direction closing the valve hole 55. On the other hand, the length of the bellows 60 changes in accordance with the suction pressure in the suction passage 32, which is introduced to the pressure sensing chamber 58 via the passage 50. The changes in the length of the bellows 60 are transmitted to the valve body 54 by the sensing rod 62. The opening area between the valve body 54 and the valve hole 55 is determined by the equilibrium of a plurality of forces acting on the valve body 54. Specifically, the opening area is determined by the equilibrium position of the body 54, which is affected by the force of the solenoid 52, the force of the bellows 60 and the force of the spring 56.

When the cooling load is great, the temperature in the passenger compartment detected by the sensor 82 is higher than a target temperature set by the temperature adjuster 84. The controller 85 sets a higher duty ratio to be transmitted to the drive circuit 74 when there is a greater difference between the detected compartment temperature and the target temperature. A higher duty ratio increases the magnitude of the attractive force between the fixed core 64 and the plunger 67 thereby increasing the resultant force urging the valve body 54 in a direction closing the valve hole 55. This lowers the value of suction pressure required for closing the valve hole 55. Thus, the valve body 54 controls the opening of the valve hole 55 based on a lower suction pressure. In other words, increasing the duty ratio causes the valve 49 to maintain a lower suction pressure (which is equivalent to a target pressure).

A smaller opening area between the valve body 54 and the valve hole 55 decreases the amount of refrigerant gas flow from the discharge chamber 39 to the crank chamber 15 via the supply passage 48. The refrigerant gas in the crank chamber 15 flows into the suction chamber 38 via the axial passage 46 and the pressure release hole 47. As a result, the pressure in the crank chamber 15 is lowered. Further, when the cooling load is great, the suction pressure is high. Accordingly, the pressure in each cylinder bore 12a is high. Therefore, the difference between the pressure in the crank chamber 15 and the pressure in each cylinder bore 12a is small. This increases the inclination of the swash plate 23, thereby causing the compressor to operate at a larger displacement.

When the valve hole 55 is completely closed by the valve body 54, the supply passage 48 is closed. This stops the supply of highly pressurized refrigerant gas in the discharge chamber 39 to the crank chamber 15. Therefore, the pressure in the crank chamber 15 becomes substantially the same as that in the suction chamber 38. The inclination of the swash plate 23 thus becomes maximum as shown in FIGS. 1 and 2, and the compressor operates at the maximum displacement.

When the cooling load is small, the difference between the compartment temperature detected by the sensor 82 and a target temperature set by the temperature adjuster 84 is small. The controller sets a lower duty ratio to be transmitted to the drive circuit 74 when there is a smaller difference between the detected compartment temperature and the target temperature. A lower duty ratio decreases the magnitude of the attractive force between the fixed core 64 and the plunger 67 thereby decreasing the resultant force urging the valve body 54 in a direction closing the valve hole 55. This increases the value of suction pressure required for closing the valve hole 55. Thus, the valve body 54 controls the opening of the valve hole 55 based on a higher suction pressure. In other words, decreasing the duty ratio causes the valve 49 to maintain a higher suction pressure (which is equivalent to a target pressure).

A larger opening area between the valve body 54 and the valve hole 55 increases the amount of refrigerant gas flow from the discharge chamber 39 to the crank chamber 15. As a result, the pressure in the crank chamber 15 is increased. Further, when the cooling load is small, the suction pressure is low. Accordingly, the pressure in each cylinder bore 12a is low. Therefore, the difference between the pressure in the crank chamber 15 and the pressure in each cylinder bore 12a is great. The greater pressure difference decreases the inclination of the swash plate 23, thereby causing the compressor to operate at a small displacement.

As cooling load approaches zero, the temperature of the evaporator 79 in the refrigerant circuit 76 drops to a frost forming temperature. When the temperature sensor 81 detects a temperature that is lower than or equal to the frost forming temperature, the controller 85 changes the duty ratio, which is transmitted to the drive circuit 74, to 0% thereby de-exciting the solenoid 52. The drive circuit 74 then stops sending current to the coil 92. This eliminates the magnetic attractive force between the core 64 and the plunger 67. The valve body 54 is then moved in a direction opening the valve hole 55 by the force of the opening spring 56 against the force of the follower spring 68 transmitted by the plunger 67 and the solenoid rod 70. As a result, the opening area between the valve body 54 and the valve hole 55 is maximized. The gas flow from the discharge chamber 39 to the crank chamber 15 is increased, accordingly. This further raises the pressure in the crank chamber 15 thereby minimizing the inclination of the swash plate 23 as shown in FIG. 3. The compressor thus operates at the minimum displacement.

When the switch 83 is turned off, the controller 85 commands the drive circuit 74 to de-excite the solenoid 52. This also minimizes the inclination of the swash plate 23.

As described above, when the duty ratio is increased, the valve body 54 of the valve 49 causes the opening area of the valve hole 55 to be controlled based on a lower suction pressure. When the duty ratio is decreased, on the other hand, the valve body 54 causes the opening area of the valve hole 55 to be controlled based on a higher suction pressure. The compressor controls the inclination of the swash plate 23 to adjust its displacement thereby maintaining a target suction pressure. That is, the valve 49 changes a target value of the suction pressure in accordance with the duty ratio. A compressor equipped with the control valve 49 varies the refrigeration level of the air conditioner.

When the inclination of the swash plate 23 is minimum, the shutting surface 34 of the shutter 28 abuts against the positioning surface 33. The abutment limits the minimum inclination of the swash plate 23. The abutment also disconnects the suction passage 32 from the suction chamber 38. This stops the gas flow from the refrigerant circuit 76 to the suction chamber 38 thereby stopping the circulation of refrigerant gas between the circuit 76 and the compressor.

The minimum inclination of the swash plate 23 is slightly more than zero degrees. Therefore, even if the inclination of the swash plate 23 is minimum, refrigerant gas in the cylinder bores 12a is discharged to the discharge chamber 39 and the compressor operates at the minimum displacement. The refrigerant gas discharged to the discharge chamber 39 from the cylinder bores 12a is drawn into the crank chamber 15 through the supply passage 48. The refrigerant gas in the crank chamber 15 is drawn back into the cylinder bores 12a through the axial passage 46, the pressure release hole 47 and the suction chamber 38. That is, when the inclination of the swash slate 23 is minimum, refrigerant gas circulates within the compressor traveling through the discharge chamber 39, the supply passage 48, the crank chamber 15, the axial passage 46, the pressure release hole 47, the suction chamber 38 and the cylinder bores 12a. This circulation of refrigerant gas causes the lubricant oil contained in the gas to lubricate the moving parts of the compressor.

De-exciting the coil 92 from an excited state generates counterelectromotive force based on the self-inductance of the coil 74. Current based on the counterelectromotive force is consumed when passing through a closed circuit formed between the coil 92 and the diode 100. The current is thus not supplied to the drive circuit 74. The counterelectromotive force generated in the coil 92 therefore does not affect the drive circuit 74. In other words, the diode 100 functions as an electric element that protects the drive circuit 74 and improves the durability and reliability of the drive circuit 74. As a result, the durability and reliability of the entire air conditioner are improved.

The diode 100 is inexpensive. The circuit for protecting the drive circuit 74 can thus be fabricated inexpensively. This lowers the manufacturing cost of the compressor.

The bobbin 91, the base plate 93 and the insulating coating 102 are made of synthetic resin, which has a great coefficient of thermal expansion. Heat generated by excitation of the solenoid 52 causes the resin members to expand. The thermal expansion enlarges the space between the clamping blocks 94a, 95a of the plates 94, 95 and the coil 92 on the bobbin 91. However, the coil 92, which is made of conductive metal, is not as expanded by heat as much as the resin members. The thermal expansion of the resin members therefore results in tension acting on the coil's terminal wires 92b, 92c held by the clamping blocks 94a, 95a.

On the way to the clamping blocks 94a, 95a, the terminal wires 92b, 92c are wound about the holders 97, 98. In other words, the terminal wires 92b, 92c are held by the holders 97, 98. The holders 97, 98 receive some of tension acting on the terminal wires 92b, 92c. In other words, the holder 97 reduces the magnitude of tension acting on the joint where the terminal wire 92b is joined to the clamping block 94a, and the holder 98 reduces the magnitude of tension acting on the joint where the terminal wire 92c is joined to the clamping block 95a. The joints between the terminal wires 92b, 92c and the clamping blocks 94a, 95a have relatively weak tensile strength. However, the holders 97, 98 prevent the terminal wires 92b, 92c from separating from their respective joints due to the tension and thus improve the conductivity between the terminal wires 92b, 92c and the clamping blocks 94a, 95a. The reliability of the control valve 49 is thus improved thus improving the reliability of the compressor.

The terminal wires 92b, 92c are held by the holders 97, 98 by simply winding the sections 92b, 92c about the holders 97, 98. Further, the holders 97, 98 not only hold the terminal wires 92b, 92c but also hold the diode 100. Therefore, there is no need to provide extra parts or structure for holding the terminal wires 92b, 92c. The holders 97, 98 simplify the structure for holding the terminal wires 92b, 92c.

As shown in FIG. 7, the terminal wires 92b, 92c extend from the bobbin 91 to the sagged corners 104b and 105b of the narrowed portions, 104, 105. Likewise, the terminal wires 92b, 92c extend from the clamping blocks 94a, 95a to the sagged corners 104a and 105a. Therefore, tension acting on the terminal wires 92b, 92c is primarily received by the sagged, or rounded, corners 104a, 104b, 105a, 105b of the narrowed portions 104, 105. In other words, the terminal wires 92b, 92c are not pressed against the burred corners 104c, 104d, 105c, 105d by tension. Thus, winding the terminal wires 92b, 92c sections about the narrowed portions 104, 105 having the burred corners 104c, 104d, 105c, 105d does not cause the terminal wires 92b, 92c to be damaged.

Burrs and sags are inevitably formed on the plates 94 and 95, since they are punched from metal slates. However, the sags are used for receiving the tension acting on the terminal wires 92b, 92c. Therefore, there is no need to round the corners of the narrowed portions 104, 105. Further, there is no need to get rid of the burrs on the narrowed portions 104, 105.

As shown in FIGS. 9A, 9B, the base plate 93 includes the guides 106, 107 protruding downward from the plates 94, 95. The guides 106, 107 prevent terminal wires 92b, 92c, which extend from the bobbin 91 to the lower side of the base plate 93, from contacting the edges 94b, 95b of the plates 94, 95. The guides 106, 107 are made of synthetic resin and have the rounded lips 106c, 107c facing the terminal wires 92b, 92c.

Therefore, when assembling the coil unit 90, the terminal wires 92b, 92c are not pressed against the edges 94b, 95b of the plates 94, 95. Further, if the terminal wires 92b, 92c receive tension, the terminal wires 92b, 92c are not pressed against the edges 94b, 95b. The tension presses the terminals 92b, 92c against the lips 106c, 107c, instead. However, the rounded lips 106c, 107c do not damage the terminal wires 92b, 92c.

In this manner, the guides 106, 197 prevent the terminal wires 92b, 92c from being damaged and from being broken. In other words, the guides 106, 107 improve the conductivity of the terminal wires 92b, 92c.

The guides 106, 107 are integrally formed with the base plate 93. The guides 116, 107 therefore do not increase the number of parts.

Temperature changes may expand or contract the base plate 93 and the coating 102. Expansion and contraction or the plate 93 and the coating 102 change the distance between the cathode holder 97 and the anode holder 98, which are formed on the base plate 93. This produces reactive force that acts on the joint between the holder 97 and the diode's cathode terminal 100a and on the joint between the holder 98 and the diode's anode terminal 100b. However, the terminals 100a, 100b are firmly fixed to the holders 97, 98 by soldering and crimping. Therefore, the reactive force acting on the joints is received by the crimped part of the holders 97, 98 and is thus not borne by the solder 103. The holders 97, 98 thus prevent fatigue failure of the solder 103 and guarantee satisfactory conductivity between the terminals 100a, 100b and the holders 97, 98.

During installation of the compressor in a vehicle, or during a maintenance of the compressor, the connector at the distal end of the power supply wire 74a is connected to and is disconnected from the connector pin 99 of the solenoid 52. Such connection and disconnection applies a reactive force to the joint of the connector pin 99 and the pin holder 96. The connector pin 99 is firmly fixed to the holder 96 by soldering and crimping. Therefore, the reactive force acting on the joint of the pin 99 and the holder 96 is received by the crimped part and is not borne by the solder 101. The holder 96 thus prevents fatigue failure of the solder 101 and guarantees satisfactory conductivity between the pin 99 and the holder 96.

Crimping is easy. Therefore, the connector pin 99 and the terminals 100a, 100b of the diode 100 are easily fixed to the holders 96, 97, 98.

The holders 96, 97, 98 have the notches 96a, 97a, 98a, respectively. The holders 96, 97, 98 are crimped with the connector pin 99 and the diode terminals 100a, 100b held in the notches 96a, 97a, 98a. The notches 96a, 97a, 98a facilitate the crimping of the holders 96, 97, 98.

The distal ends of the holders 96, 97, 98 are bent by 180 degrees and are thus approximately twice as thick as the rest of the holders 96, 97, 98. Accordingly, the contact area of the pin 99 and the holder 96a and the contact area of the terminals 100a, 100b and the holders 97a, 98a are increased. The larger the area of contact is, the more dispersed the force generated by crimping becomes. Therefore, crimping the holders 96, 97, 98 with relatively great force does not deform or damage the pin 99 and the terminals 100a, 100b. Thus, the holders 96, 97, 98 can be crimped by a greater force to improve the attachment strength of the connector pin 99 and the diode 100.

The base plate 93 is integrally formed with the bobbin 91. The terminal wires 92b, 92c of the coil 92, the connector pin 99 and the diode 100 are attached to the base plate 93 to form a unit, or the coil unit 90. The coil unit 90 is easy to handle and thus facilitates the assembly of the control valve 49.

A second embodiment of the present invention will now be described with reference to FIG. 10. In this embodiment, the holders 97, 98 lie in the same plane and are spaced apart. The distal ends of the holders 97, 98 are bent to hold the terminals 100a, 100b of the diode 100. This construction eliminates the necessity for forming notches to hold the terminals 100a, 160b. Therefore, compared to the embodiment of FIGS. 1–9, the embodiment of FIG. 10 has a simpler structure for attaching the diode 100 to the holders 97, 98. This construction may also be applied to the attachment of the connector pin 99 to the pin holder 96.

A third embodiment of the present invention will now be described with reference to FIG. 11. In this embodiment, the diode terminals 100a, 100b are fixed to the holders 97, 98 only by solder 103. That is, the terminals 100a, 100b are not fixed to the holders 97, 98 by a mechanical method such as crimping. The terminals 100a, 100b are bent in the longitudinal direction of the holders 97, 98. Specifically, the terminals 100a, 100b are formed like a crank. The form of the terminals 100a, 100b locates the diode 100 closer to the proximal end of the holders 97, 98, or to the base plate 93, compared to the embodiment of FIGS. 1–9. The diode 100 is therefore accommodated in the space defined between the holders 97 and 98 as in the embodiment of FIGS. 1–9.

Temperature changes may expand or contract the base plate 93 and the coating 102. Expansion and contraction of the plate 93 and the coating 102 change the distance between the holders 97 and 98. As shown by double dotted lines in FIG. 11, the crank-shaped diode terminals 100a, 100b deform to change the length of the diode 100 as the distance between the holders 97 and 98 changes. The deformation of the terminals 100a, 100b absorbs forces acting on the diode 100 and the holders 97, 99. Accordingly, the reactive force that acts on the solder 103 is minimized. This prevents fatigue failure of the solder 103 and guarantees satisfactory conductivity between the terminals 100a, 100b and the holders 97, 98.

Figure 11:
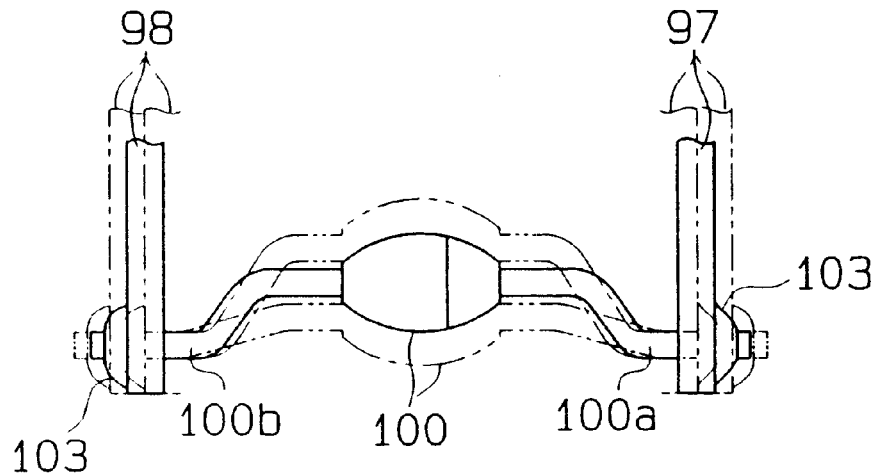
FIG. 11 is an enlarged front view illustrating a mounting structure of a diode to holders according to a third embodiment of the present invention.

The embodiment of FIG. 11 is easy to carry out by simply bending the diode terminals 100a, 100b into a crank-shape.

The whole diode 100 is accommodated in the space defined by the holders 97, 98. In other words, the holders 97, 98 protect the diode 100. For example, the holders 97, 98 prevent other parts from interfering with the diode 100 during assembly and prevents a worker or a tool from touching the diode 100a. Thus, the diode 100a is not damaged during assembly.

Figure 12:
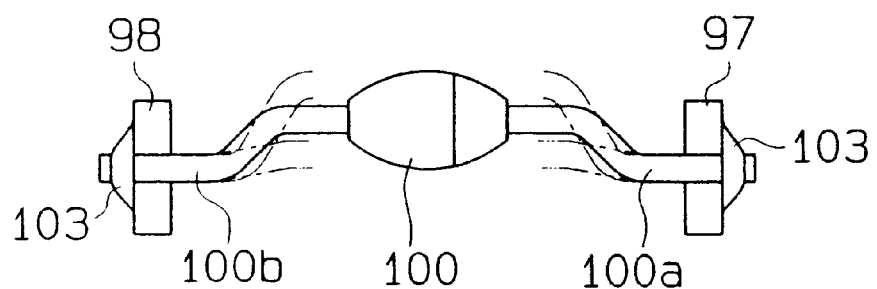
FIG. 12 is an enlarged bottom view illustrating a mounting structure of a diode to holders according to a fourth embodiment of the present invention.

FIG. 12 illustrates a fourth embodiment of the present invention. In this embodiment, the diode terminals 100a, 100b are bent in a direction perpendicular to the longitudinal direction of the holders 97, 98. As in the embodiment of FIG. 11, the terminals 100a, 100b are formed like a crank. Therefore, the diode 100 is located outside the space defined between the holders 97, 98. However, the distance between the base plate 93 and the diode 100 is not changed when the terminals 100a, 100b are flexed by the forces of thermal expansion. Therefore, even if the length of the holders 97, 98 is less than that of the embodiment of FIG. 11, the diode 100 does not interfere with other parts on the base plate 93.

Figure 13:
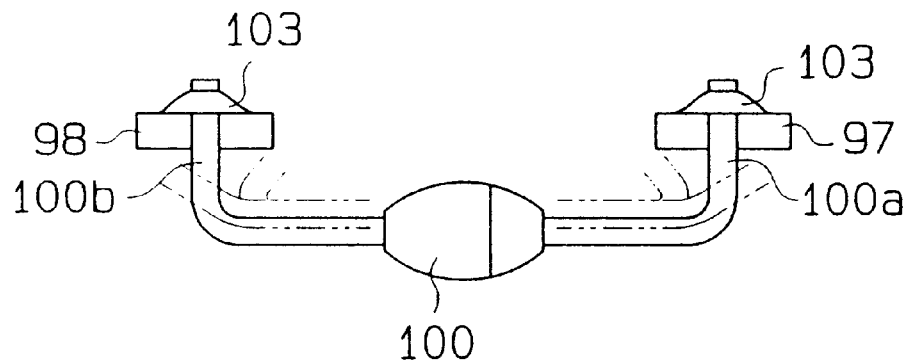
FIG. 13 is an enlarged bottom view illustrating a mounting structure of a diode to holders according to a fifth embodiment of the present invention.

FIG. 13 illustrates a fifth embodiment of the present invention. As in the embodiment of FIG. 10, holders 97, 98 lie in the same plane and are spaced apart. However, the terminals 100a, 100b are bent at right angles and are soldered to the holders 97, 98.

Figure 14:
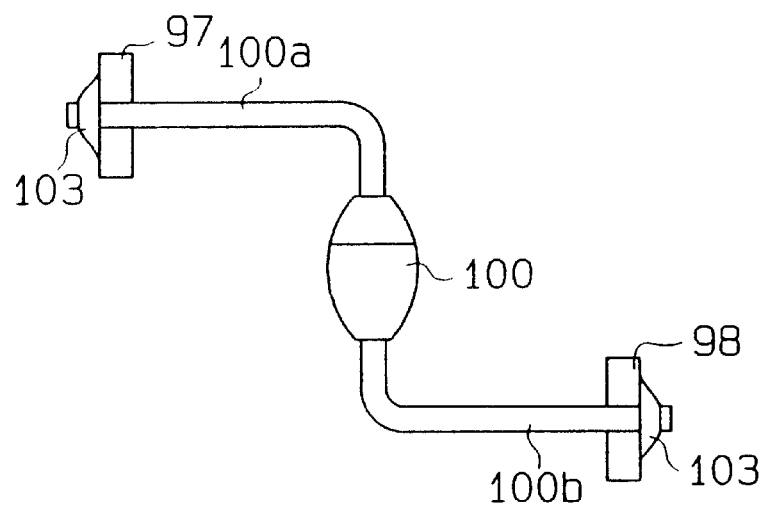
FIG. 14 is an enlarged bottom view illustrating a mounting structure of a diode to holders according to a sixth embodiment of the present invention
Figure 15:
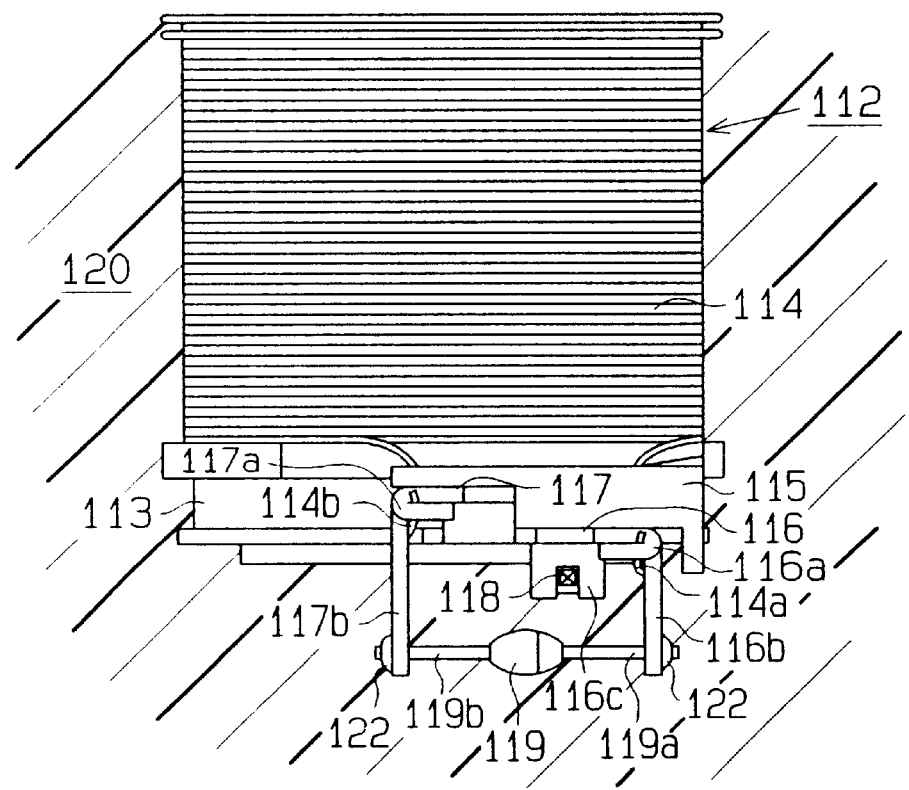
FIG. 15 is an enlarged view illustrating the coil unit of a prior art solenoid.
Figure 16:
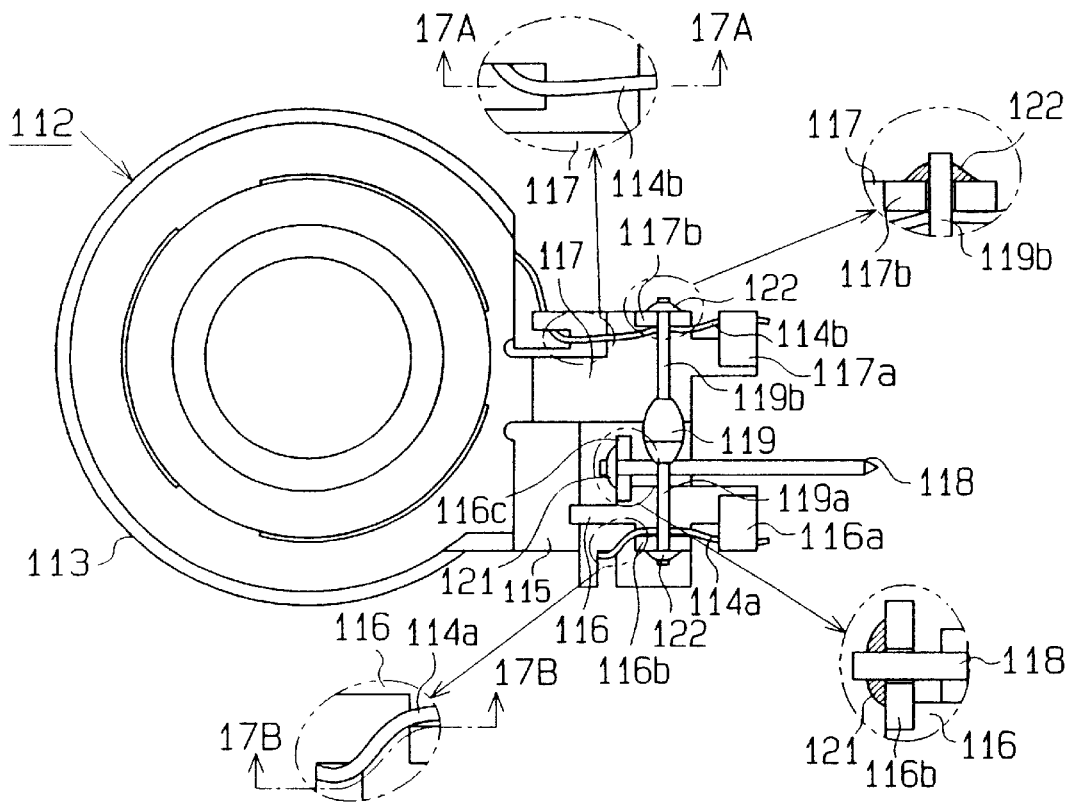
FIG. 16 is a bottom view illustrating the coil unit of FIG. 15.
Figure 17A:
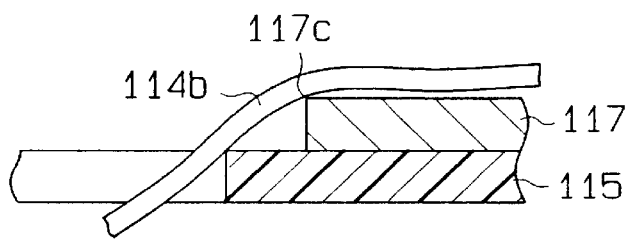
FIG. 17A is a cross-sectional view taken along line 17A—17A of FIG. 16.
Figure 17B:
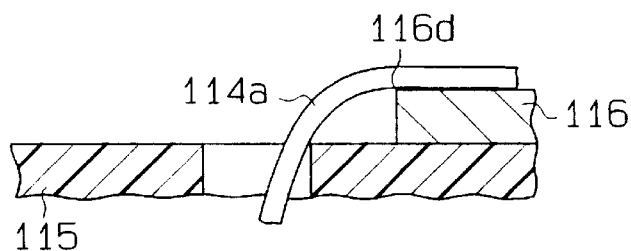
FIG. 17B is a cross-sectional view taken along line 17B—17B of FIG. 16.

FIG. 14 illustrates a sixth embodiments of the present invention. In this embodiment, the holders 97, 98 are arranged in parallel planes but are not aligned with each other. The terminals 100a, 100b are bent at right angles in opposite directions and are soldered to the holders 97, 98.

As in the embodiments of FIGS. 13, 14, the diode Terminals 100a, 100b may be bent in any direction in accordance with the location and orientation of the holders 97, 98. In any case, the terminals 100a, 100b are flexed by thermal expansion forces and change the effective length of the diode 100 in accordance with changes in the distance between the holders 97 and 98. In other words, the bent terminals 100a, 100b absorb forces acting on the solder 103.

In the embodiments of FIGS. 11–14, both terminals 100a, 100b are bent. However, only one of the terminals 100a, 100b may be bent.

The present invention may be alternatively embodied in the following forms:

In the embodiment of FIGS. 1–9, the holders 97, 98 hold the diode 100 and the terminal wires 92b, 92c of the coil 92. However, the plates 94, 95 may have holders, which are formed separately from the holders 97, 98, for holding the terminal wires 92b, 92c.

In the illustrated embodiments, the narrowed portion 104 for winding the supply terminal wire 92b is formed on the cathode holder 97. However, the narrowed portion 104 may be formed on the pin holder 96.

The method for mechanically fixing the connector pin 99 and the diode terminals 100a, 100b to the holders 96, 97, 98 is not limited to crimping. For example, the pin 99, and terminals 100a, 100b may be fixed to the holders 96, 97, 98 by bolts. Alternatively, the proximal end of the connector pin 99 and the terminals 100a, 100b may be wound about the holders 96, 97, 98.

Solder for fixing the connector pin 99 and the diode terminals 100a, 100b to the holders 96, 97, 98 is not limited to soft solder. The pin 99 and the terminals 100a, 100b may be brazed to the holders 96, 97, 98 by hard solder.

The electric element for protecting the drive circuit 74 is not limited to the diode 100. A bipolar transistor or a metal oxide semiconductor (MOS) transistor may be employed.

The displacement of the compressor illustrated in FIG. 1 is controlled by adjusting the amount of refrigerant gas supplied to the crank chamber 15 by the control valve 49. However, the displacement of the compressor may be controlled by other methods. For example, the displacement may be controlled by adjusting the amount of refrigerant gas discharged from the crank chamber 15. Alternatively, the displacement may be controlled by adjusting the amount of refrigerant gas supplied to the crank chamber 15 and the amount of refrigerant gas discharged from the crank chamber 15. Further, the displacement may be controlled by adjusting the pressure in the cylinder bores 12*a*.

The compressor of FIG. 1 is directly coupled to the vehicle engine 20 without a clutch. However, the compressor may be coupled to the vehicle engine 20 by a clutch.

Therefore, the present examples and embodiments are to be considered as illustrative and not restrictive and the invention is not to be limited to the details given herein, but may be modified within the scope and equivalence of the appended claims.

What is claimed is:

1. A valve including a solenoid and a valve body actuated by the solenoid, wherein the solenoid includes a coil and generates electromagnetic force to actuate the valve body based on electric current supplied to the coil, the valve comprising:

a support made of insulating synthetic resin for supporting the coil, wherein the coil includes a terminal wire extending from the support;

a conductive mounting member secured to the support, wherein the mounting member includes a connecting member to which the terminal wire is electrically fixed; and a holding member formed on the mounting member for holding part of the terminal wire between the support and the connecting member.

2. The valve according to claim 1, wherein the holding member protrudes from the mounting member, and wherein the terminal wire is wound about the holding member.

3. The valve according to claim 1, further comprising an electrical component electrically connected to the coil through the mounting member, wherein the mounting member includes a holder, and wherein the electrical component is brazed to and mechanically secured to the holder.

4. The valve according to claim 3, wherein the electrical component includes a connector pin detachably connected to a drive circuit that controls supply of electric current to the coil.

5. The valve according to claim 3, wherein the electrical component includes an electrical element connected in parallel with the coil, wherein electrical current produced by a counterelectromotive force based on self-inductance of the coil passes through the electrical element, wherein the electrical element includes a pair of terminals, and wherein the mounting member includes a pair of mounting plates, which are spaced apart, each having a holder, and wherein each terminal of the electrical element is electrically fixed to one of the holders.

6. The valve according to claim 3, wherein the holder is crimped to mechanically secure the electrical component to the holder.

7. The valve according to claim 6, wherein the holder has a holding recess, and wherein the holder is crimped with the electrical component located in the holding recess.

8. The valve according to claim 7, wherein the holder is folded to increase the thickness of a cart adjacent to the holding recess.

9. The valve according to claim 3, wherein the holder also functions as the holding member, and wherein the terminal wire is wound about the holder.

10. The valve according to claim 1 further comprising an electrical element electrically connected to the coil through the mounting member, wherein the electrical element includes a pair of terminals, the mounting member includes a pair of mounting plates, each having a holder, wherein the holders are spaced apart by a predetermined distance, wherein each terminal of the electrical element is secured to one of the holders, and wherein at least one of the terminals is bent to allow the effective length of the electrical element between the holders to be changed.

11. The valve according to claim 10, wherein the electrical element is connected in parallel with the coil for causing electrical current produced by a counterelectromotive force based on self-inductance of the coil to pass through the electrical element.

12. The valve according to claim 1, wherein the support includes a bobbin to wind the coil and a base plate extending from the bobbin, and wherein the mounting member is secured to the base plate.

13. The valve according to claim 12, wherein the base plate includes a guide member to prevent the terminal wire between the bobbin and the connecting member of the mounting member from contacting an edge of the mounting member.

14. The valve according to claim 13, wherein the guide member protrudes from the base plate by a distance that is greater than the thickness of the mounting member, and wherein the guide member has a rounded lip contacting the terminal wire.

15. A valve including a solenoid and a valve body actuated by the solenoid, wherein the solenoid includes a coil and generates electromagnetic force to actuate the valve body based on electric current supplied to the coil, the valve comprising:

a bobbin made of insulating synthetic resin to wind the coil;

a base plate integrally protruding from the bobbin, wherein the coil includes a pair of terminal wires that extend from the bobbin toward the base plate;

a pair of conductive mounting plates secured to the base plate, wherein each mounting plate includes a connecting member, and wherein each terminal wire is fixed to and electrically connected to one of the connecting members;

an insulation coating made of synthetic resin to cover the coil and the mounting plates; and a holding member formed on each mounting plate for holding part of the corresponding terminal wire between the bobbin and the connecting member, and wherein each terminal wire is wound about the corresponding holding member.

16. The valve according to claim 15, further comprising an electrical element connected in parallel with the terminal wires of the coil through the mounting plates, wherein electrical current produced by a counterelectromotive force based on self-inductance of the coil passes through the electrical element, and wherein the electrical element has a pair of terminals that are brazed to the holding members and are mechanically secured to the holding members, respectively.

17. The valve according to claim 15, further comprising a connector pin electrically connected to one of the terminal wires of the coil through one of the mounting plates, wherein the connector pin is detachably connected to a drive circuit that controls supply of electric current to the coil, and wherein the connector pin is brazed to and is mechanically secured to one of the holding members.

18. The valve according to claim 15, further comprising an electrical element connected in parallel with the terminal wires of the coil through the mounting plates, wherein electrical current produced by counterelectromotive force based on self-inductance of the coil passes through the electrical element, wherein the electrical element includes a pair of terminals each secured to the holding members, and wherein at least one of the terminals is bent to allow the effective length of the electrical element between the holding members to be changed.

19. The valve according to claim 15, wherein the base plate includes a pair of guide members to prevent the terminal wires between the bobbin and the connecting members or the mounting plates from contacting edges of the mounting plates, wherein each guide member protrudes from the base plate by a distance that is greater than the corresponding thickness of the corresponding mounting plate, and wherein each guide member has a rounded lip contacting the corresponding terminal wire.

20. A control valve in a variable displacement compressor that adjusts the discharge displacement in accordance with the inclination of a drive plate located in a crank chamber, wherein the compressor includes a piston operably coupled to the drive plate, the piston being located in a cylinder bore, wherein the piston compresses gas supplied to the cylinder bore from a suction chamber and discharges the compressed gas to a discharge chamber from the cylinder bore, wherein the inclination of the drive plate is variable according to the difference between the pressure in the crank chamber and the pressure in the cylinder bore, wherein the compressor further includes an adjusting device for adjusting the difference between the pressure in the crank chamber and the pressure in the cylinder bore, wherein the adjusting device includes the control valve and a gas passage for conducting gas, wherein the control valve regulates the amount of the gas flowing in the gas passage, the control valve comprising:

a solenoid having a coil;

a valve body actuated by the solenoid, wherein the solenoid generates electromagnetic force to actuate the valve body based on electric current supplied to the coil;

a bobbin made of insulating synthetic resin to wind the coil;

a base plate integrally protruding from the bobbin, wherein the coil includes a pair of terminal wires that extend from the bobbin toward the base plate;

a pair of conductive mounting plates secured to the base plate, wherein each mounting plate includes a connecting member, and wherein each terminal wire is electrically fixed to one of the connecting members;

an insulating coating made of synthetic resin to cover the coil and the mounting plates; and a holding member formed on each mounting plate for holding part of the corresponding terminal wire between the bobbin and the corresponding connecting member.

* * * * *

UNITED STATES PATENT AND TRADEMARK OFFICE
CERTIFICATE OF CORRECTION

PATENT NO. : 6,033,189
DATED : March 7, 2000
INVENTOR(S) : SHINTARO MIURA et al.

It is certified that error appears in the above-identified patent and that said Letters Patent is hereby corrected as shown below:

Title page, first column, after "[73] Assignees:" change "Kabushikki" to --Kabushiki--.

Title page, second column, in the Abstract, line 9, change "corrected" to --connected--.

Column 2, line 25, change "17a" to --117a--; line 48, change "mad" to --may--.

Column 5, line 55, change "3" to --28--.

Column 6, line 14, change "toe" to --the--.

Column 7, line 7, before "valve" insert --the--; line 66, change "93" to --97--.

Column 8, line 53, change "136" to --106--.

Column 9, line 23, change "34, 95" to --94, 95--; line 35, change "31" to --91--; line 58, change "36" to --96--.

Column 12, line 61, change "slate" to --plate--.

Column 15, line 24, change "160b" to --100b--; line 51, change "97, 99" to --97, 98--.

Column 19, line 9, change "or" to --of--.

Signed and Sealed this

Twenty-second Day of May, 2001

Attest:

NICHOLAS P. GODICI

*Attesting Officer*  *Acting Director of the United States Patent and Trademark Office*